INVENTOR
Thurman Q. Skains
BY *Ehley & Ehley*
ATTORNEYS

Sept. 5, 1967    T. Q. SKAINS    3,339,576
IRRIGATION PIPE SUPPORTING CARRIAGE
Filed July 14, 1965    3 Sheets-Sheet 2

INVENTOR
Thurman Q. Skains
BY *Shley & Shley*
ATTORNEYS

Sept. 5, 1967  T. Q. SKAINS  3,339,576
IRRIGATION PIPE SUPPORTING CARRIAGE
Filed July 14, 1965  3 Sheets-Sheet 3
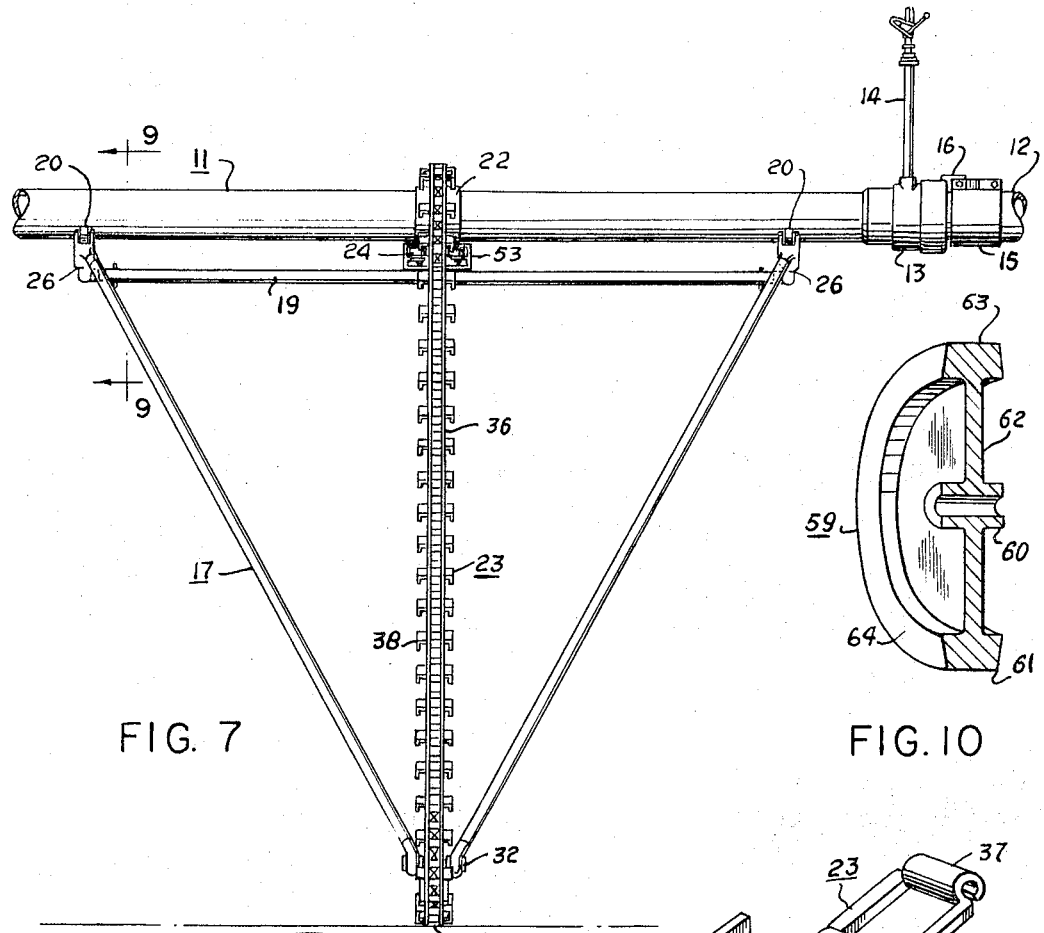
FIG. 7
FIG. 10
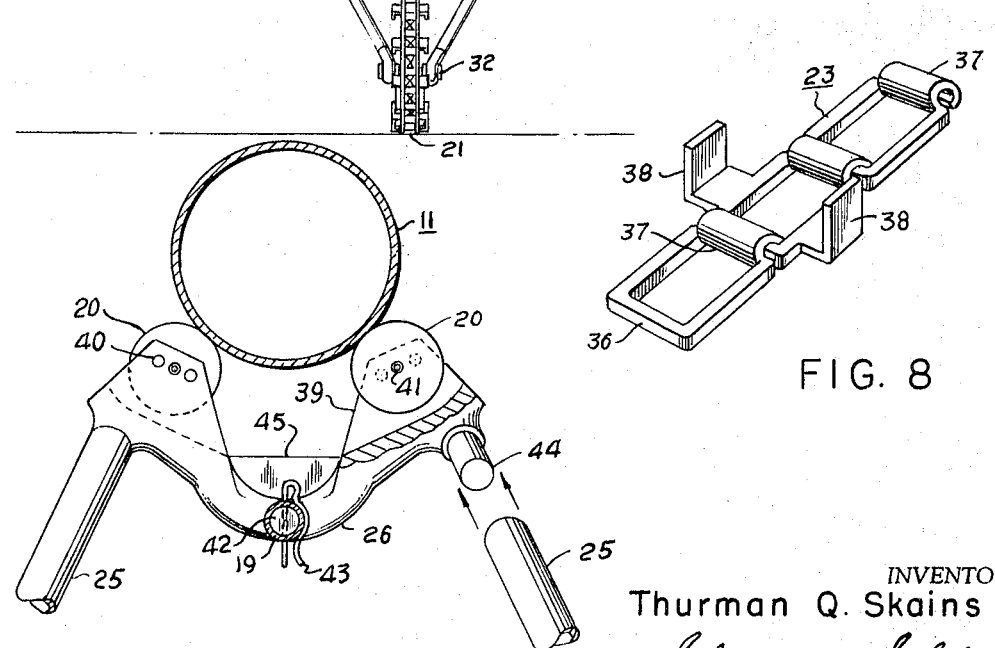
FIG. 8
FIG. 9
INVENTOR
Thurman Q. Skains
BY Ehley & Ehley
ATTORNEYS

United States Patent Office 3,339,576
Patented Sept. 5, 1967

3,339,576
IRRIGATION PIPE SUPPORTING CARRIAGE
Thurman Q. Skains, 1616 E. Cardwell,
Brownfield, Tex. 79316
Filed July 14, 1965, Ser. No. 471,858
15 Claims. (Cl. 137—344)

This invention relates to new and useful improvements in carriages for movably supporting irrigation pipe.

The carriage of this invention includes a frame having means for rotatably supporting a portion of an irrigation pipe, which may be many hundreds of feet in length, and an endless track for imparting travel to said said carriage upon rotation of the pipe so as to move said pipe from one location to another. The track is trained over a sprocket fixed on the pipe between the rotatable supporting means and a pair of rollers or sprockets rotatably mounted on the frame and having a lower flight portion extending between the pair of rollers or sprockets for supporting engagement with the ground, said frame having means for rotatably confining the pipe fixed sprocket to prevent relative displacement between the carriage and pipe in coaction with said track and rotatable supporting means. Preferably, guide means extends between the pair of rollers or sprockets in overlying engagement with the lower flight portion of the track, said track having means for slidably engaging the guide means, and the means for rotatably supporting the pipe is adjustable to accommodate irrigation pipe of different diameters. The frame is formed of tubular members detachably connected by brackets so as to be readily assembled for use and dissassembled for storage and transportation as well as being of extremely light weight.

A contruction designed to carry out the invention will be hereinafter described, together with other features of the invention.

The invention will be more readily understood from a reading of the following specification and by reference to the accompanying drawings, wherein an example of the invention is shown, and wherein:

FIG. 1 is an elevational view of an irrigation pipe carriage constructed in accordance with the invention, the pipe being shown in section, FIG. 2 is an enlarged, horizontal, sectional view taken on the line 2—2 of FIG. 1, FIG. 3 is an enlarged, transverse, vertical, sectional view taken on the line 3—3 of FIG. 1, FIG. 4 is a top plan view of the carriage and a portion of the irrigation pipe, FIG. 5 is an enlarged, transverse, vertical sectional view taken on the line 5—5 of FIG. 4, FIG. 6 is an enlarged, elevational view, partly in section, of the sprocket mounted on the pipe, shown in section, for engagement by the endless track of the carriage.

FIG. 7 is a side elevational view of the carriage and a portion of the pipe,

FIG. 8 is an enlarged, perspective view of a portion of the endless track,

FIG. 9 is an enlarged, transverse, vertical, sectional view, partly in section, taken on the line 9—9 of FIG. 7, and FIG. 10 is an enlarged, perspective view of one-half of one of the rollers for engagement by the endless track in place of the lower sprockets of the carriage.

Figure 4:
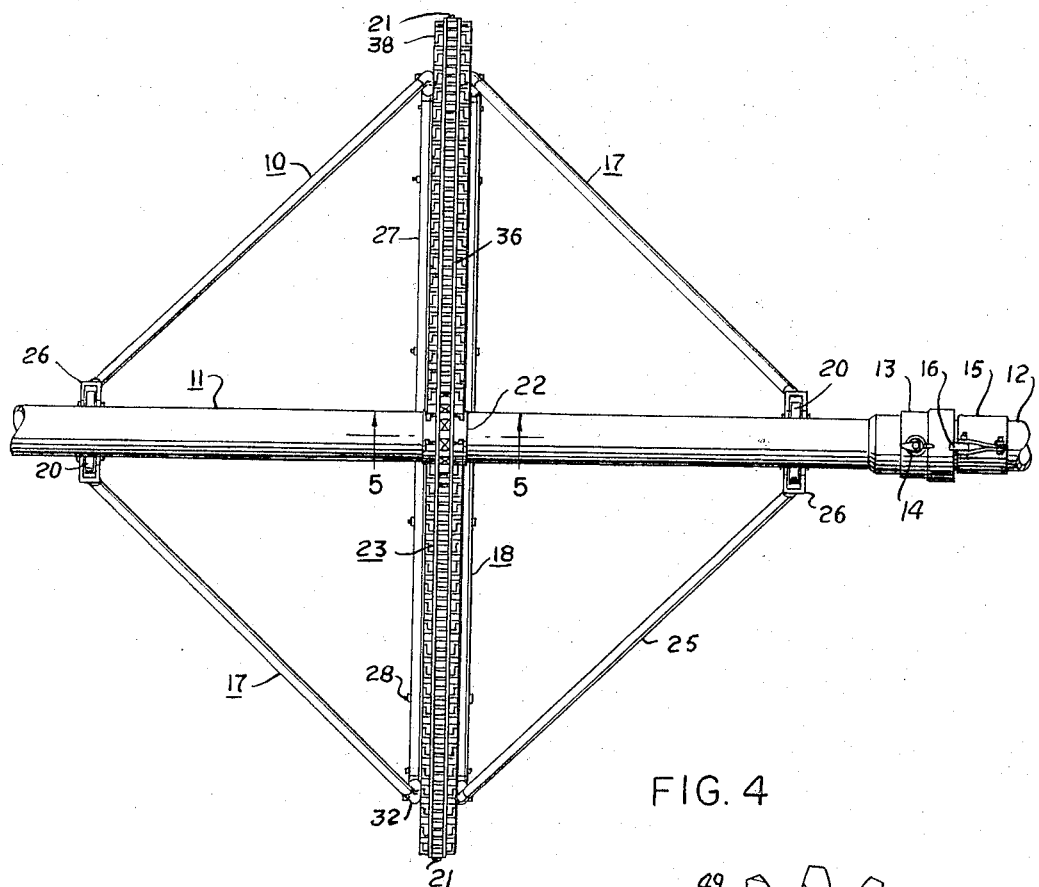

In the drawings, the numeral 10 designates the frame of one of a plurality of carriages for rotatably supporting an irrigation pipe 11 of the elevated, lightweight type having a multiplicity of sections 12 and capable of being many hundreds of feet in length. Conventional couplings 13 connect adjacent sections 12 of the pipe 11 and certain of the couplings have revolving sprinklers 14 upstanding therefrom at suitably spaced intervals of said pipe. Usually, one of the couplings 13 is formed on or secured at one end of each pipe section for receiving the end of the adjacent pipe section and is detachably fastened to said adjacent section by suitable fastening means, such as a bolted clamp 15 encircling the latter pipe section and a lug 16 projecting from the coupling (FIGS. 4 and 7) to prevent relative longitudinal and rotational movement between the pipe sections. Each carriage frame 10 includes a pair of complementary, upright, end sections 17 which are substantially triangular, a lower substantially horizontal section 18 connecting the lower ends of the upright frame sections and adapted to extend perpendicular to the pipe, and an upper substantially horizontal section or member 19 connecting the upper ends of said upright sections and adapted to extend in longitudinal, underlying relation to said pipe.

A pair of spaced rollers 20 are rotatably mounted at the upper end of each upright frame section 17 in underlying engagement with the pipe 11 so as to support said pipe (FIG. 9). For propelling the carriage upon rotation of the pipe, sprockets 21 are rotatably mounted at the ends of the lower frame section 18 and a similar sprocket 22 is adapted to be fixed on said pipe in a common vertical plane (FIGS. 1, 2 and 5) for engagement by an endless track 23 which coacts with the rollers 20 to confine the carriage and pipe against relative displacement. A pair of spaced rollers 24 are rotatably mounted on the upper frame member or section 19 (FIG. 5) for confining the sprocket 22 therebetween to prevent relative longitudinal movement between the carriage and pipe.

Figure 1:
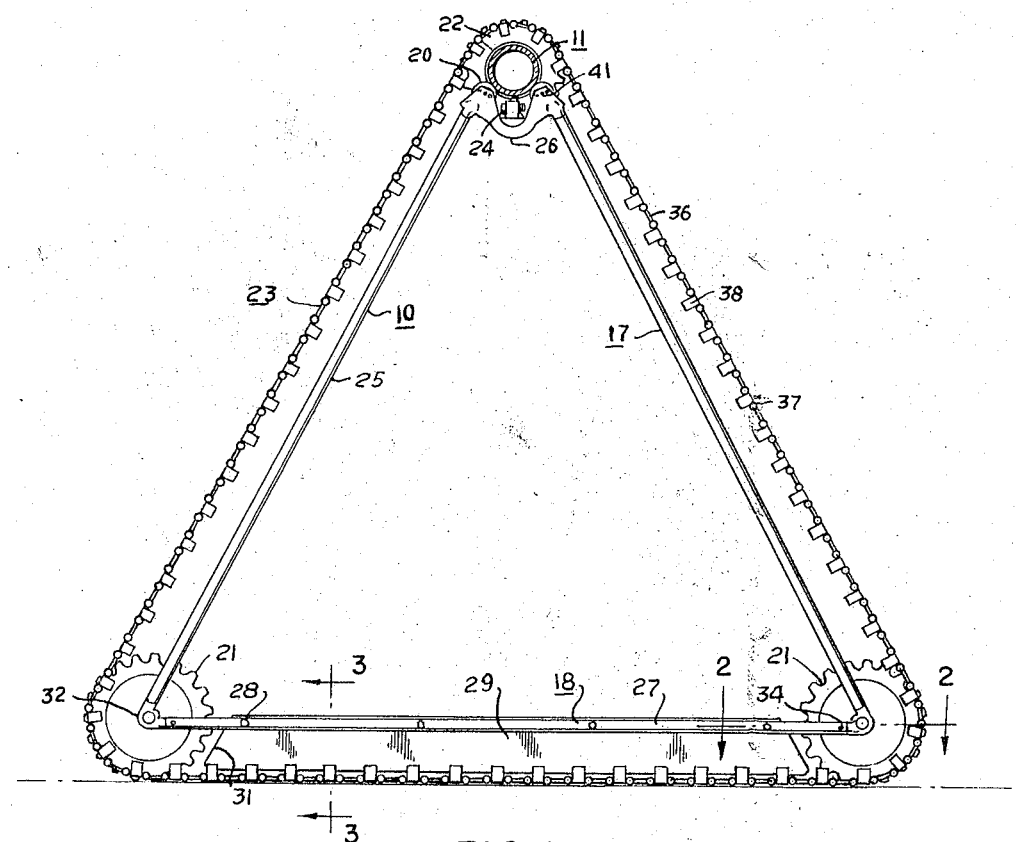
Figure 2:
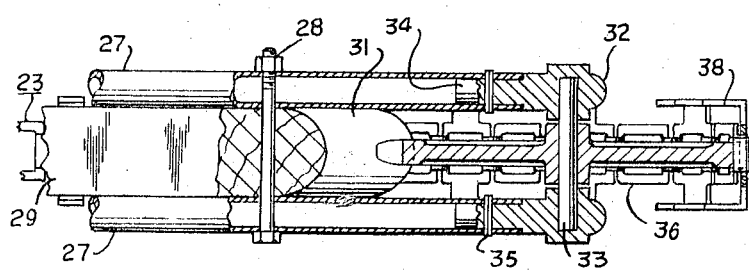
Figure 3:
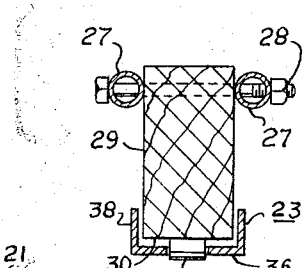

Each upright frame section 17 includes a pair of elongate, upright, downwardly divergent, tubular members or legs 25 having their upper ends connected in spaced relationship by a bracket 26 extending horizontally and transversely therebetween and supporting the rollers 20. An elongate, horizontal, tubular member 27 extends transversely between and connects the lower ends of the legs 25 of each upright frame section as well as forming a portion of the lower frame section 18 so as to be common to both sections. The upright frame sections converge downwardly and have their lower members 27 in parallel proximity, whereby the frame 10 is substantially rectangular in plan (FIG. 4) and V-shaped in side elevation (FIG. 7) as well as of inverted V-shape in end elevation (FIG. 1). As shown in FIGS. 2 and 3, the lower frame members are connected by transverse bolts and nuts 28 and have an elongate guide element 29, of wood or other suitable material, confined therebetween by the bolts so as to form a portion of the lower frame section 18. The guide element 29 is rectangular in cross-section and depends below the frame members 27 to present a flat face or underside 30 (FIG. 3) in overlying engagement with the lower flight portion of the endless track 23 which extends between the sprockets 21 and engages the ground to support the carriage. As shown at 31 in FIGS. 1 and 2, each end of the guide element is inclined upwardly inward to permit positioning thereof in close proximity to the adjacent sprocket and may be bevelled or chamfered to minimize interference with the movement of the track.

An angular or V-shaped bracket 32 connects adjacent ends of the frame members 25 and 27 and a pin 33 extends transversely between the apex portions of adjacent brackets for connecting the brackets and rotatably supporting one of the sprockets 21 (FIG. 2). Each bracket 32 has cylindrical, divergent end portions or arms 34, of reduced diameter, for telescoping engagement within the ends of the frame members and the lower arm is detachably connected to the frame member 27 by a transverse pin 35. As shown most clearly in FIG. 8, the endless track 23 is in the form of a continuous chain having flat, rectangular links 36. A transverse collar 37 is provided at one end of each link 36 for receiving the end of the adjacent link and opposed, angular lugs 38 project laterally from the sides of certain of the links, such as alternate links, so as to extend inwardly toward the frame and upstand from the lower flight of the track for straddling the guide element 29 (FIGS. 2 and 3).

As shown most clearly in FIG. 9, each bracket 26 is in the form of an inverted, wide, shallow yoke and has upstanding end portions 39 which are bifurcated longitudinally of the bracket to provide a pair of ears at each end thereof. A plurality of openings 40 extends transversely of each end portion 39 for receiving a pin 41 to rotatably support one of the rollers 20 between the ears, whereby said rollers have axes extending longitudinally of the pipe 11. Due to the plurality of openings 40, the rollers may be adjusted toward and away from each other for supporting irrigation pipe of different diameters. A cylindrical arm or lug 42, similar to the arms 34 of the brackets 32, projects horizontally inward from the medial portion of each bracket 26 for telescoping engagement within one of the upper frame member 19 and detachable connection thereto by a cotter pin or other fastener 43. Each end portion 39 of each bracket has similar arms or lugs 44 depending therefrom at an outward inclination for telescoping engagement within the upper end of one of the upright frame members 25, whereby the brackets coact with the upper frame member to detachably connect the upper ends of the upright frame sections 17 as well as provide adjustable mountings for the rollers 20. An upright, reinforcing web 45 may extend transversely between the end portions of each bracket. Although detachable therefrom, the brackets 26 form portions of the upper frame section as well as the upright frame sections 17.

Figure 5:
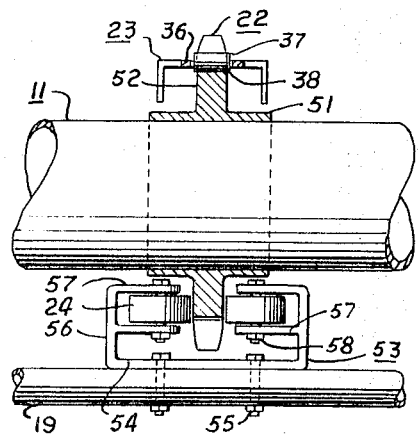
Figure 6:
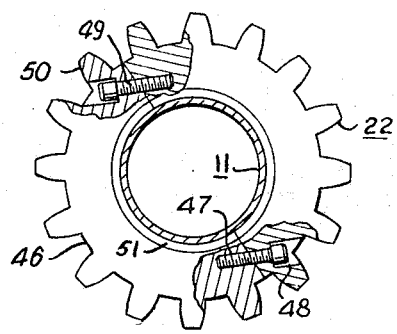

The sprocket 22 is split diametrically into a pair of halves or segments 46 for clamping engagement with the pipe 11 (FIGS. 5 and 6). A screwthreaded opening 47 extends tangentially of one end of each sprocket segment 46 in registration with a countersunk opening 48 formed in the adjacent end of the other segment for receiving a bolt 49. The outer end of each countersunk opening 48 is disposed at the base of one of the endmost teeth 50 of each sprocket segment and in the space between said tooth and the adjacent tooth. The sprocket has a relatively wide hub 51 for increasing its surficial contact with the pipe and a flat web 52 for engagement by the rollers 24. A bracket 53 upstands from the medial portion of the upper frame member 19 for rotatably supporting the rollers and has an elongate base 54 extending longitudinally of and secured to said member by bolts and nuts 55 (FIG. 5). Each end of the base 54 of the bracket 53 has an upright arm or leg 56 upstanding therefrom to support a pair of parallel, spaced flanges 57 at its upper portion in spaced relation to said base. The flanges 57 of each leg 56 extend transversely inward from the leg in spaced alinement with the flanges of the other leg and have one of the rollers confined therebetween by a bolt and nut 58, whereby the bolts or axis of rotation of said rollers extend radially of the pipe.

It is noted that the rollers 20 and 24 and endless track 23 coact to prevent relative displacement between the carriage and irrigation pipe. Whenever it is desired to move the pipe 11, it is rotated so as to turn the sprocket 22 for driving the track. Since the lower flight portion of the track 23 engages the ground, each of the carriages is propelled transversely of the pipe so as to bodily move the entire length of said pipe from one location to another. It is noted that any suitable prime mover may be utilized to rotate the pipe and that said pipe is adapted to remain stationary during watering. Each carriage is readily removable from supporting engagement with the pipe upon disconnection of its track, and the brackets 26 may be lifted from engagement with the upright frame members 25 to separate the upper frame section from the upright frame sections 17 due to the slip joint connection provided by the arms 44 of said brackets. Similar slip joint connections are provided by the upper arms 34 of the brackets 32 to permit disengagement of the upright frame members 25 therefrom. Also, the brackets 26 may be disconnected from the upper frame member 19 upon removal of the fasteners 43. Accordingly, the carriages are adapted to be readily assembled for use and disassembled for compact storage and transportation. In addition, it is pointed out that the carriages are of extremely light weight due to the minimum number of frame members and the tubular form thereof.

If desired, a roller 59 may be substituted for each of the sprockets 21 since the sprocket 22, fixed on the pipe 11, is sufficient to drive the endless track 23. As shown in FIG. 10, each sprocket 59 has a hub 60 for mounting on one of the pins 33 and connected to an annular rim 61 by a web 62 of reduced thickness. The rim 61 has a smooth periphery 63 and may have outwardly convergent sides 64 for guiding the track in coaction with the lugs 38.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A carriage for movably supporting an irrigation pipe including a frame having a pair of upright end sections, an upper substantially horizontal frame section connecting the upper end portions of the upright frame sections and adapted to extend longitudinally of an irrigation pipe, a lower substantially horizontal frame section connecting the lower end portions of said upright frame sections and having portions adapted to project transversely of the irrigation pipe, means at the upper end portions of said upright frame sections for rotatably supporting the irrigation pipe, rotatable means mounted on the projecting portions of the lower substantially horizontal frame section, sprocket means adapted to be fixed on the irrigation pipe intermediate the means for rotatably supporting said pipe, and endless track means trained over the rotatable and sprocket means for imparting travel to the carriage upon rotation of the irrigation pipe and having a lower flight portion underlying said lower frame section and extending between said rotatable means for engaging the ground.

2. A carriage as set forth in claim 1 wherein each of the means for rotatably supporting the irrigation pipe is adjustable for supporting pipe of different diameters.

3. A carriage as set forth in claim 1 wherein the lower substantially horizontal frame section includes guide means extending between the lower portions of the rotatable means of said section in overlying engagement with the lower flight portion of the endless track means.

4. A carriage as set forth in claim 1 including means mounted on the upper substantially horizontal frame section intermediate the means for rotatably supporting the irrigation pipe for rotatably confining the sprocket means fixed on the pipe to prevent displacement of the carriage longitudinally of said pipe.

5. A carriage as set forth in claim 4 wherein the means for rotatably confining the pipe fixed sprocket means includes opposed roller means rotatable about the axes transverse to the irrigation pipe for engaging opposite sides of said sprocket means.

6. A carriage as set forth in claim 1 wherein each of the means for rotatably supporting the irrigation pipe includes opposed roller means rotatable about axes parallel to the irrigation pipe and in underlying engagement with said pipe, the endless track means and roller means coacting to prevent relative displacement between the carriage and pipe.

7. A carriage as set forth in claim 6 wherein the roller means are mounted in adjustable positions for supporting irrigation pipe of different diameters.

8. A carriage as set forth in claim 1 wherein the lower substantially horizontal section of the frame is elongated transversely of the upper substantially horizontal frame section and the end frame sections converge downwardly to said lower frame section.

9. In combination with an irrigation pipe, a carriage for rotatably supporting the irrigation pipe including a frame having a pair of complementary upright sections, each frame section having a pair of upright downwardly diverging members connected at their upper ends and a member extending transversely between and connecting the lower ends of the upright members, means at the upper end of each frame section adapted to rotatably support said irrigation pipe, means connecting the transverse members of the frame sections, the frame having a horizontal member extending between and connecting the upper ends of said frame sections and adapted to underlie said pipe, a sprocket adapted to be fixed on said pipe intermediate the pipe supporting means, means rotatably mounted at and between the ends of said transverse frame members, and an endless track trained over the sprocket and rotatably mounted means for propelling the carriage upon rotation of said pipe and having a lower flight portion extending longitudinally of said transverse frame members for engaging the ground.

10. The combination set forth in claim 9 wherein each of the means adapted to rotatably support the irrigation pipe includes a bracket extending transversely between and connecting the upper ends of the upright members of each frame section to each other and to the longitudinal member of the carriage frame, and a pair of spaced rollers mounted on the bracket for rotation about axes parallel to said longitudinal frame member for underlying engagement with the irrigation pipe, the endless track and rollers coacting to prevent relative displacement between the carriage and pipe.

11. The combination set forth in claim 10 wherein each bracket has means for mounting its rollers in positions adjustable toward and away from each other for supporting irrigation pipe of different diameters.

12. The combination set forth in claim 9 including a guide element extending longitudinally of and between the transverse members of the frame sections and depending below said members in overlying engagement with th elower flight portion of the endless track.

13. The combination set forth in claim 9 wherein the frame sections converge downwardly and have the transverse members thereof in close proximity to each other.

14. The combination set forth in claim 9 including means upstanding from the longitudinal member of the carriage frame for rotatably confining the sprocket adapted to be fixed on the irrigation pipe to prevent displacement of the carriage longitudinally of said pipe.

15. The combination set forth in claim 10 wherein the upstanding means includes a pair of spaced rollers mounted for rotation above axes transverse to the longitudinal frame member for engaging opposite sides of the sprocket adapted to be fixed on the irrigation pipe.

References Cited
UNITED STATES PATENTS

| | | | |
|---|---|---|---|
| 1,966,783 | 7/1934 | Balaam | 239—213 |
| 2,711,615 | 6/1955 | Boice | 239—177 |
| 2,889,948 | 6/1959 | Leuenberger | 239—212 X |
| 2,931,579 | 4/1960 | Ruddell | 239—212 X |
| 3,157,193 | 11/1964 | Purtell | 137—344 |
| 3,166,088 | 1/1965 | Kern | 137—344 |
| 3,166,089 | 1/1965 | Wagner | 137—344 |
| 3,230,969 | 1/1966 | Purtell | 137—344 X |
| 3,255,968 | 6/1966 | Stafford | 239—212 |

M. CARY NELSON, *Primary Examiner.*

S. SCOTT, *Assistant Examiner.*